Nov. 26, 1963 W. S. HOLDEN ETAL 3,112,445
SUPERREGENERATIVE TRANSISTOR TRANSCEIVER
Filed Aug. 17, 1961
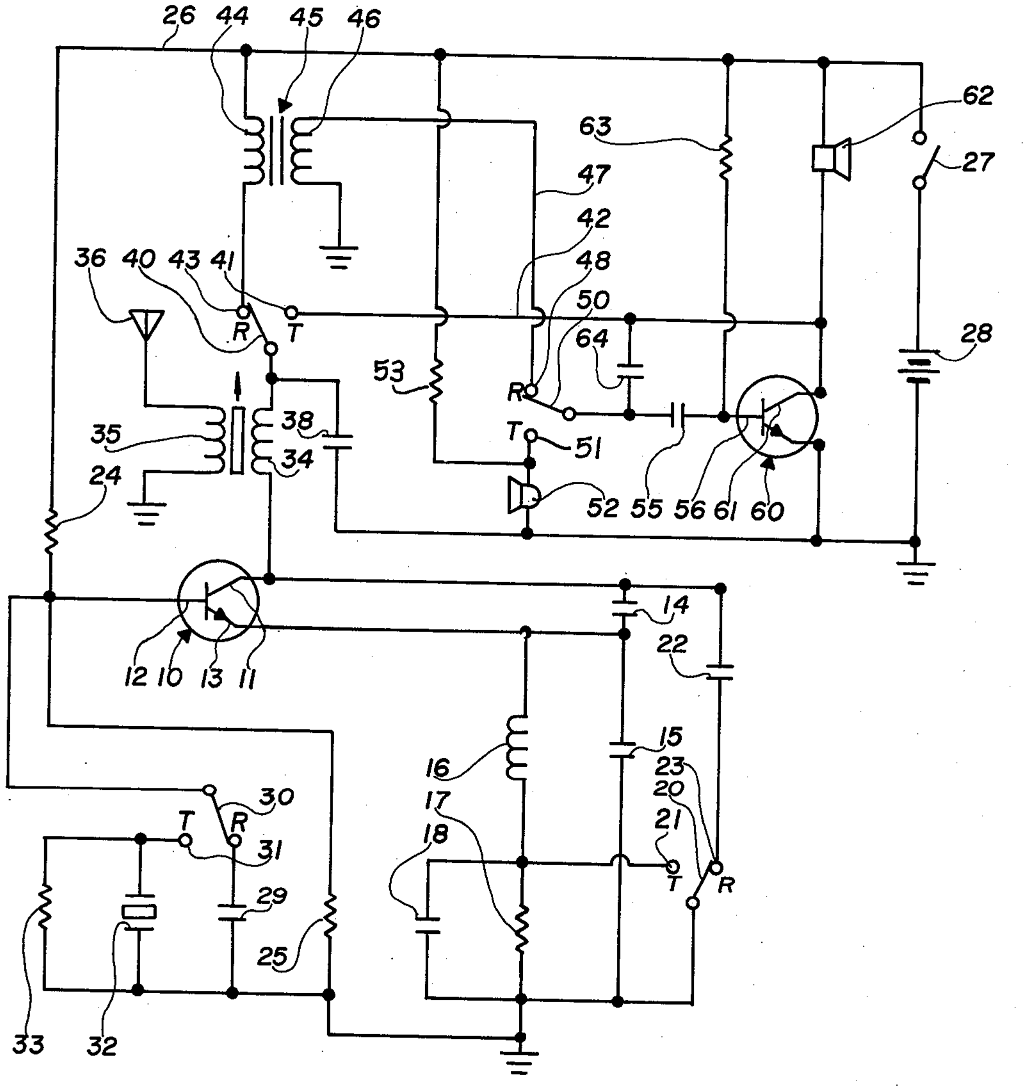
W. S. HOLDEN &
I. T. JONES
INVENTORS.
BY John G. Graham 3,112,445
Patented Nov. 26, 1963

3,112,445

SUPERREGENERATIVE TRANSISTOR TRANSCEIVER

William S. Holden, Dallas, and Iradell Thomas Jones, Arlington, Tex., assignors to Texas Instruments Incorporated, Dallas, Tex., a corporation of Delaware Filed Aug. 17, 1961, Ser. No. 132,121
3 Claims. (Cl. 325—19)

This invention relates to radio communication equipment and more particularly to a combination transmitter-receiver adapted for short-range communication at low power levels.

The allocation of the certain frequencies of about 27 mc. for unlicensed operation has made available to the public a channel of communication for short ranges which requires little or no licensing procedures and is subject to no restrictions or controls other than power level and bandspread. This offers a great potentiality for transceivers using this frequency for localized communication in industrial applications, by sportsmen, or in toys. However, the transmitter-receivers which have heretofore been developed are relatively complex, requiring many expensive components.

It is the principal object of this invention to provide a combination radio transmitter and receiver employing a minimum of components and circuitry. It is another object of this invention to provide a small transceiver for use in the 27 mc. range of simple and inexpensive construction so as to be marketable as a toy or amusement device.

In accordance with this invention, a low power transceiver adapted for unlicensed operation is provided which utilizes a circuit having only two transistors or amplifying devices and a minimum of circuitry therefor. When the transceiver is in the transmit condition, the circuit of one transistor acts as a crystal-controlled, collector-modulated Colpitts oscillator. The circuit of the other transistor has its input connected to a microphone in the transmit condition and its output is then used to modulate the oscillator circuit. In the receive condition, the circuit of the first transistor functions as a superregenerative receiver while the circuit of the second transistor is an audio output stage. Detection is provided by a transformer and shunt capacitor coupling arrangement which also attenuates the superregenerative quench frequency component. This quench component may be further reduced in the audio stage by negative feedback at the appropriate frequency. In the receive mode, the crystal is not used so that the bandwidth will be somewhat greater, thus reducing the need for tuning.

The novel features believed characteristic of this invention are set forth in the appended claims. The invention itself, however, along with further objects and advantages thereof, may best be understood by reference to the following description of a particular embodiment, when read in conjunction with the accompanying drawing, wherein the single FIGURE is a schematic diagram of a transceiver circuit incorporating the principal features of this invention.

With reference to the figure, a transmitter-receiver circuit is shown utilizing a first transistor 10 having a collector 11, a base 12 and an emitter 13. The collector and emitter are shunted by a capacitor 14 while a capacitor 15 connects the emitter 13 to ground. The emitter is further connected through a choke 16 and a biasing resistor 17 to ground, a by-pass capacitor 18 shunting the resistor. The resistor 17 and the capacitor 18 are selected to provide superregenerative quenching of oscillations in the receive condition. In the transmit condition, the resistor 17 and the capacitor 18 are shorted by a switch 20 contacting a terminal 21. In the receive condition, an additional capacitance is provided by a capacitor 22 which is in the circuit only when the switch 20 contacts a terminal 23. The base 12 of the transistor 10 is connected to the junction of a pair of biasing resistors 24 and 25, the other end of the resistor 25 being grounded while the remaining terminal of the resistor 24 is connected to a supply line 26. The line 26 is connected through an off-on switch 27 to a voltage supply or battery 28. The base 12 is further connected to ground in the receive condition through a capacitor 29 which is contacted by a transmit-receive switch 30. When the switch 30 is in the transmit position or contacting a terminal 31, the base 12 is shunted to ground through a crystal 32 having a resonant frequency of 27.125 mc. This crystal is not necessary for the operation of the circuit as an oscillator, but may be required to eliminate drift and confine the tranmitter output to a particular frequency, according to government regulations. A resistor 33 shunts the crystal 32 to change the D.-C. bias on the base 12 during the transmit condition.

The collector 11 of the transistor 10 is connected to a variable inductor 34 which forms the receiver tuning element by utilizing a movable slug core. A coil 35 is inductively coupled to the inductor 34 and this coil is connected to an antenna 36 which may take the form of a telescoping whip about four feet long. The inductor 34 is grounded for RF at one end by a bypass capacitor 38 and this end of the inductor is also connected to a transmit-receive switch 40. In the transmit position, the switch 40 contacts a terminal 41 which is connected by a line 42 to the output of the other transistor stage. In the receive position, the switch 40 contacts a terminal 43 which is connected through a primary winding 44 of a transformer 45 to the supply line 26. It is seen that the circuit of the transistor 10 is in the form of a common-base Colpitts oscillator which operates continuously in the transmit mode with collector modulation, and quenches periodically in a superregenerative fashion in the receive mode.

The transformer 45 includes a secondary winding 46, one side of which is connected by a line 47 to a terminal 48 of another transmit-receive switch 50. When in the transmit position, the switch 50 contacts a terminal 51 which is connected to a microphone 52, this being the transceiver audio input. Preferably, a carbon microphone is used, so a resistor 53 is connected between the microphone and the supply line 26 to provide bias current. In the receive condition, the switch 50, contacting the terminal 48, connects the input of the second transistor stage to the transformer output of the superregenerative oscillator-detector provided by the first stage. The switch 50 is connected by a capacitor 55 to a base electrode 56 of a transistor 60. The emitter of this transistor is grounded while a collector electrode 61 is connected to the supply line 26 through a load comprising a loudspeaker 62. The collector 61 is also connected back to the terminal 41 of the switch 40 by the line 42, the loudspeaker acting as merely a load impedance or modulation choke when in the transmit condition. The transistor 60 is biased by a resistor 63 connected between the supply line 26 and the base 56. A capacitor 64 may be connected between the collector 61 and the capacitor 53 to provide feedback at the quench frequency of the superregenerative circuit so that the audio amplifier stage will not be saturated thereby. This feedback capacitor is not essential, but permits higher quality audio output.

While the actual values and types of the circuit components in the transceiver described above may vary depending upon the requirements of a particular application, the following specifications are given by way of example only:

| | | |
|---|---|---|
| Capacitor 14 | pfd | 18 |
| Capacitor 15 | pfd | 82 |
| Capacitors 18, 38, and 64 | μfd | 0.01 |
| Capacitor 22 | pfd | 7 |
| Capacitor 29 | μfd | 0.001 |
| Capacitor 55 | μfd | 2 |
| Resistor 17 | ohms | 1.5K |
| Resistor 24 | do | 18K |
| Resistors 25 and 33 | do | 2.2K |
| Resistor 53 | do | 4.7K |
| Resistor 63 | do | 56K |
| Inductor 16 | μhy | 22 |
| Transistor 10 | | R424 |
| Transistor 60 | | 2N1273 or 2N1303 |
| Battery 28 | v | 6–9 |
| Microphone 52 (Western Electric F–1) | ohms | 100 |
| Speaker 62 | do | 175 |

The inductor 34 may take the form of about eight turns of No. 28 enamel wire wound on a ¼-inch paper form. The inductor 35, coupled to the coil 34, may be about three turns of No. 28 wire wound on the same form. Concerning the transformer 45, the windings 44 and 46 have 10K ohm and 2K ohm A.-C. impedance, respectively, and 700 ohm and 120 ohm D.-C. resistance, respectively.

The four transmit-receive switches 20, 30, 40 and 50 may take the form of a four-pole double-throw push-button switch adapted to be normally spring-biased in the receive position and to be thrown to the transmit position by pushing a single button.

The operation of the circuit described above will first be examined in the receive condition or when the switches 20, 30, 40 and 50 are contacting the appropriate terminals marked R. In this situation the transistor 10 and associated circuitry comprise a self-quenched superregenerative receiver. The inductor 34 and the capacitor 14 are the primary frequency-determining tank circuit elements, the capacitor 22 being used to compensate for the difference in circuit capacitance for the receive mode. The capacitors 14 and 15 provide a feedback divider arrangement to apply the proper magnitude of positive feedback to the emitter 13. The base 12 is grounded for RF by the large capacitor 29 so that a Colpitts-type oscillator configuration is provided. This capacitor 29 prevents negative feedback which would reduce the gain of the stage. The resistor 17 and the capacitor 18 determine the quench frequency of the superregenerative circuit, the time constant of these two components being much greater than the RF period but less than the period of audio frequencies. This time constant determines the repetition rate of RF bursts at the quench frequency. The impedance of the series circuit including the inductor 16 and the resistor 17 at RF is large, but there is some RF current flow through the resistor 17. This current will flow only during positive peaks and so the capacitor 18 will be charged by a small increment during each cycle. The voltage across the capacitor 18 will build up until the D.-C. voltage on the emitter 13 exceeds the voltage on the base 12 provided by the voltage divider 24 and 25. This cuts off the transistor or reduces its gain to less than that required to sustain oscillations, allowing the capacitor 18 to discharge through the resistor 17 to a point allowing oscillation to begin again. In the circuit described, the quench frequency is around 40 to 100 kc. The build-up of oscillations during one of the superregenerative bursts will be related to the amount of RF energy injected into the coil 34 by the antenna 36. Therefore the average amplitude of the oscillations existing across the inductor 34 and the capacitor 14 will depend upon the RF input to the antenna. The capacitor 38 along with the primary winding 44 function as a low-pass filter so that the output on the secondary winding 46 of the transformer will follow the envelope of the received signals, the RF being filtered out and the quench frequency or 40–100 kc. component being substantially reduced. The audio frequency output of the winding 46 is applied through the coupling capacitor 55 to the base of the transistor 60 which amplifies the audio signals to drive the coil of the speaker 62. Negative feedback may be applied to the base of this transistor by the capacitor 64, this capacitor having a much lower impedance at the quench frequency than at audio frequency so that the quench frequency component is again attenuated.

In the transmit condition, or when the switches 20, 30, 40 and 50 are contacting the appropriate terminals marked T, the change in voltage across the carbon microphone 52 due to the sound input is applied to the base of the transistor 60. The resultant variation in collector current varies the drop across the coil of the speaker 62. The voltage on the line 42 is thus modulated or varies at the audio frequency and this voltage is used as the supply source for the cirrcuit of the transistor 10, thus changing the amplitude of the oscillations. The resistor 17 and capacitor 18 are out of the circuit in the transmit condition, being shorted by the switch 20 so that quenching does not occur. The oscillator tank is made up of the inductor 34 and the capacitor 14, the latter being part of the feedback divider including the capacitor 15. The choke 16 offers a much higher RF impedance than the capacitor 15, allowing RF feedback to appear on the emitter. In the transmit mode, a somewhat smaller forward bias is developed on the base 12 by the parallel resistors 25 and 33 in series with the resistor 24, promoting high amplitude oscillation. The base 12 is grounded for radio frequency by the crystal 32, allowing no negative feedback. At other frequencies considerable feedback to the base will occur, resulting in no gain at other than the crystal frequency. The RF oscillation in the tank circuit 14, 34 is of course coupled to the antenna 36 by the coil 35.

While this invention has been described with reference to a specific embodiment, the description is not meant to be construed in a limiting sense. It is, of course, understood that various modifications may be made by persons skilled in the art, and so it is contemplated that the appended claims will coiver any such modifications as fall within the true scope of the invention.

What is claimed is:

1. A transceiver circuit comprising a transistor having a base, an emitter and a collector, a voltage source having first and second terminals and an intermediate terminal, said base being connected to said intermediate terminal, a first inductor connected at one end to said collector, antenna means coupled to said first inductor, a transformer having a primary winding and a secondary winding, a loudspeaker, means for selectively connecting the other end of said first inductor to said first terminal through one of said primary winding and said loudspeaker, capacitive means having a low impedance above audio frequencies connected between said other end of said first inductor and said second terminal, a first capacitor connected across said collector and emitter, a second capacitor connecting said emitter to said second terminal, said first inductor along with said first and second capacitors forming a tank circuit resonant at a radio frequency, a second inductor connected to said emitter, a resistor connecting said second inductor to said second terminal, a third capacitor connected across said resistor to provide quenching of oscillations at a given frequency, means for selectively shorting said third capacitor, a fourth capacitor having a low impedance at said radio frequency, a crystal sharply tuned to said radio frequency, means for selectively connecting one of said crystal and said fourth capacitor between said base and said second terminal, an audio amplifier including a transistor and having an input circuit and an output circuit, a microphone, and means for selectively connecting one of said microphone and said secondary winding in said input circuit of said audio amplifier, said loudspeaker being connected in said output circuit of said audio amplifier.

2. A transceiver circuit comprising a transistor having a base, an emitter and a collector, a voltage source having first and second terminals and an intermediate terminal, said base being connected to said intermediate terminal, a first inductor connected to said collector, said first inductor being connected to said first terminal through one of a first pair of alternate paths determined by a first switch, one of said first pair including a primary winding of a transformer, the other of said first pair including a loudspeaker coil, antenna means coupled to said first inductor, a first capacitor connected across said first inductor by a second and a third capacitor in series to form a tank circuit resonant to a radio frequency, said second capacitor being much larger than said first capacitor and said third capacitor being much larger than said second capacitor, the juncture of said first and second capacitors being connected to said emitter to provide positive feedback so that oscillation occurs at said radio frequency, the juncture of said second and third capacitors being connected to said second terminal, said emitter being connected to said second terminal through a second inductor and a resistor, a fourth capacitor shunting said resistor and providing a time constant therewith which is much greater than the period of said radio frequency, said resistor and said fourth capacitor being adapted to produce quenching of oscillations at a particular frequency, means for selectively shorting said resistor to prevent occurrence of said quenching, said base being connected to said second terminal through one of a second pair of alternate paths, one of said second pair including a fifth capacitor having a very low impedance at said radio frequency, the other of said second pair including a crystal resonant at said radio frequency, and an amplifying device having an input circuit and an output circuit, said output circuit including said loudspeaker coil and said voltage source, said input circuit including a secondary winding on said transformer in a receive mode of operation and including a microphone in a transmit mode of operation.

3. A transceiver circuit adapted for operation at a particular radio frequency comprising a transistor having a base, an emitter and a collector, a first inductor connected between said collector and a first switch, a first capacitor shunting said collector and emitter, said first inductor and said first capacitor appearing as a parallel resonant circuit at said radio frequency, antenna means coupled to said first inductor, a second inductor and a first resistor connected in series between said emitter and a reference potential, a second capacitor shunting said first resistor, said second capacitor and said first resistor having a time constant much greater than the period of said radio frequency and much less than the period of audio frequency signals to provide quenching at a particular frequency, a second switch shunting said first resistor, a third capacitor having a magnitude much greater than said first capacitor connecting said emitter to said reference potential, said second inductor having a reactance much greater than that of said third capacitor at said radio frequency and much less than that of said third capacitor at audio frequencies and at said quenching frequency, a voltage divider connected between a voltage source and said reference potential, said base being connected to an intermediate point on said voltage divider to provide operating bias thereto, a fourth capacitor offering a low impedance to said radio frequency and a high impedance to audio frequencies and to said quenching frequency, said fourth capacitor having one terminal connected to said reference potential, a crystal resonant to said radio frequency having one terminal connected to said reference potential, a second resistor shunting said crystal, a third switch adapted to connect said base to one of said crystal and said fourth capacitor, a transformer having a primary winding a secondary winding, one terminal of said primary winding being connected to said voltage source and the other terminal being connected to said first switch, said secondary winding being connected to a fourth switch, said fourth switch being further connected to a microphone, an amplifying device having input, output and common electrodes, said input electrode being capacitively coupled to said fourth switch, a loudspeaker connected between said output electrode and said voltage source, said output electrode being further connected to said first switch, and a fifth capacitor having a relatively low impedance at said quenching frequency and a relatively high impedance at audio frequencies coupled between said input and output electrodes to provide negative feedback, said first, second, third and fourth switches being operative in unison to convert said transceiver circuit from a condition of operation wherein the circuit of said transistor functions as a superregenerative receiver and detector while the circuit of said amplifying device functions as an audio output stage to a condition of operation wherein the circuit of said transistor operates as a continuous oscillator modulated by the output of the circuit of said amplifying device.

References Cited in the file of this patent

UNITED STATES PATENTS 2,915,708 Mohler ---------------- Dec. 1, 1959

FOREIGN PATENTS 312,079 Great Britain ----------- May 22, 1930

430,408 Great Britain ---------- June 18, 1935

OTHER REFERENCES

Chow: "Superregenerative Transistor Transceiver," Electronics, April 1, 1957, pp. 180–182.